(12) United States Patent
Uchiyama

(10) Patent No.: US 10,106,014 B2
(45) Date of Patent: Oct. 23, 2018

(54) OPERATION KNOB FOR REGISTER

(71) Applicant: HOWA PLASTICS CO., LTD., Toyota-shi, Aichi-ken (JP)

(72) Inventor: Shota Uchiyama, Toyota (JP)

(73) Assignee: HOWA PLASTICS CO., LTD., Toyota (JP)

( * ) Notice: Subject to any disclaimer, the term of this patent is extended or adjusted under 35 U.S.C. 154(b) by 57 days.

(21) Appl. No.: 14/953,083

(22) Filed: Nov. 27, 2015

(65) Prior Publication Data

US 2016/0200177 A1 Jul. 14, 2016

(30) Foreign Application Priority Data

Jan. 13, 2015 (JP) ................................. 2015-003950

(51) Int. Cl.
*B60H 1/34* (2006.01)

(52) U.S. Cl.
CPC ... *B60H 1/3421* (2013.01); *B60H 2001/3471* (2013.01)

(58) Field of Classification Search
USPC ........................................................ 454/155
See application file for complete search history.

(56) References Cited

U.S. PATENT DOCUMENTS

| | | | | |
|---|---|---|---|---|
| 3,552,295 A | * | 1/1971 | Armstrong ........... | B60H 1/3421 454/155 |
| 6,293,860 B1 | * | 9/2001 | Kim ..................... | B60H 3/0608 454/155 |
| 9,073,407 B2 | * | 7/2015 | Kober .................. | B60H 1/3414 |
| 2005/0097704 A1 | * | 5/2005 | Song .................... | B60H 1/3414 16/110.1 |
| 2006/0014485 A1 | * | 1/2006 | Sousa .................. | B60H 1/3421 454/315 |
| 2007/0111653 A1 | * | 5/2007 | Endou .................. | B60H 1/3421 454/155 |
| 2008/0119124 A1 | * | 5/2008 | Okuno ................. | B60H 1/3428 454/69 |
| 2009/0137200 A1 | * | 5/2009 | Fujiwara .............. | B60H 1/3421 454/254 |

(Continued)

FOREIGN PATENT DOCUMENTS

| | | | | |
|---|---|---|---|---|
| GB | 2232760 B | * | 6/1993 | ........... B60H 1/3421 |
| JP | 2014-148190 A | | 8/2014 | |

*Primary Examiner* — Gregory Huson
*Assistant Examiner* — Frances F Hamilton
(74) *Attorney, Agent, or Firm* — Oliff PLC

(57) ABSTRACT

An operation knob that includes fin insertion holes formed at both side surfaces of the operation knob, a jig insertion hole formed at a side of the operation knob, and a separation portion formed by separating a part of the jig insertion hole. In the separation portion, a connection portion partially connects an upper facing side and a lower facing side of the connection portion and retains a predetermined clearance therebetween. The first separation surface of the connection portion on the upper facing side and the second separation surface of the connection portion on the lower facing side are contacted with each other, thus even if the connection portion is deformed so that the clearance becomes narrower, a minimum clearance corresponding to a height of the connection portion is retained based on the first separation surface and the second separation surface contacting each other.

1 Claim, 9 Drawing Sheets

(56) References Cited

U.S. PATENT DOCUMENTS

Figure 1:
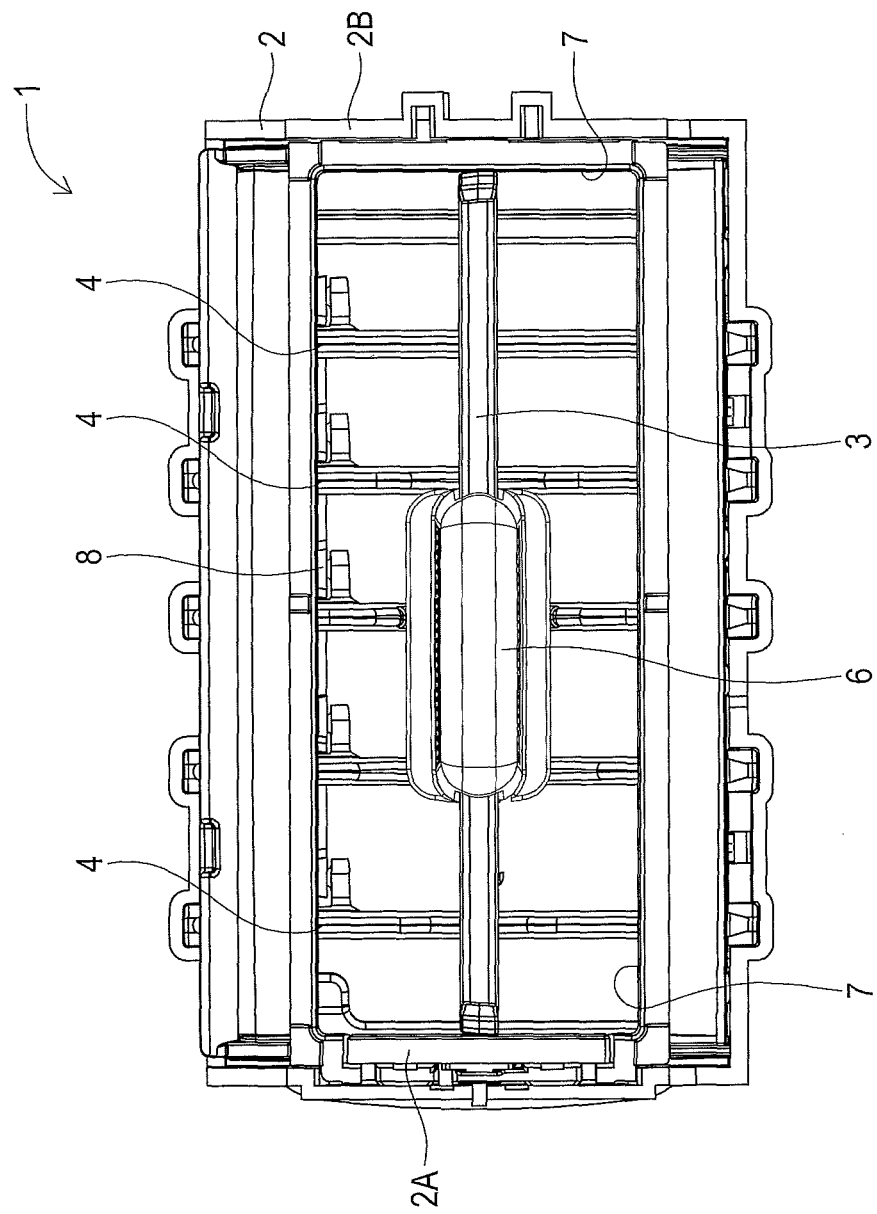

| | | | | |
|---|---|---|---|---|
| 2009/0286462 | A1* | 11/2009 | Goto | B60H 1/3428 |
| | | | | 454/155 |
| 2012/0291893 | A1* | 11/2012 | Yamamoto | B60H 1/3428 |
| | | | | 137/551 |
| 2014/0308889 | A1* | 10/2014 | Oe | F24F 13/15 |
| | | | | 454/315 |
| 2015/0328959 | A1* | 11/2015 | Suzuki | B60H 1/3421 |
| | | | | 454/155 |
| 2016/0229259 | A1* | 8/2016 | Kwon | B60H 1/0065 |
| | | | | 454/155 |
| 2016/0313025 | A1* | 10/2016 | Nemoto | F24F 13/06 |
| 2017/0057327 | A1* | 3/2017 | Shibata | B60H 1/3421 |

* cited by examiner

OPERATION KNOB FOR REGISTER

BACKGROUND OF THE INVENTION

1. Field of the Invention

The present invention relates to an operation knob operated when air direction is adjusted in a register utilized for air-conditioning of a vehicle.

2. Description of Related Art

Conventionally, in a register utilized for air-conditioning of a vehicle, a plurality of vertical fins are rotatably supported in a retainer so as to be able to rotate in a right and left direction, and one or a plurality of lateral fins are slidably supported near an air outlet of the retainer so as to be able to rotate in an up and down direction. Further, the register is constructed so that an operation knob slidably disposed in one lateral fin and the vertical fins are mutually connected through one of various connection mechanisms In such register, each of the vertical fins is simultaneously rotated together in the right and left direction through the connection mechanism based on that the operation knob is slid in the right and left direction, and each of the lateral fins is simultaneously rotated together in the up and down direction based on that the operation knob is moved in the up and down direction.

As for the operation knob used in the above conventional register, the operation knob is generally constructed from two knob members of an upper knob member and a lower knob member, and both knob members are resiliently engaged with each other while sandwiching both sides of the lateral fine between the upper knob member and the lower knob member.

Since such kind of the operation knob is constructed from two knob members, cost of the operation knob rises and the process to assemble two knob members on both sides of the lateral fin is necessitated, thus such assembling process becomes the cause for cost rising of the operation knob.

Therefore, in order to reduce cost of the operation knob and simplify assemble process of the operation knob to the lateral fin, it is proposed in Japanese Publication laid open No. 2014-148190 an operation knob which is formed into one body as one member and assembled to the lateral fin.

Concretely, in the above Japanese Publication laid open No. 2014-148190, in order to form the operation knob into one body, it is disclosed an operation knob in which an opening is formed at a side opposite to a vertical fin and two gear parts is divisionally formed at both upper and lower sides of the opening, two gear parts being meshed with a gear formed on the vertical fin. By adopting this construction of the operation knob, the operation knob can be formed into one body from resin while using two upper and lower dies and a plurality of movable dies.

When the operation knob disclosed in the above Japanese Publication No. 2014-148190 is attached to the lateral fin, the lateral fin is inserted in one of side openings formed at both side of the operation knob. At that time, the operation knob is attached to the lateral fin by resiliently deforming the side opening. However, there may be a case that this attaching method becomes rather difficult. Therefore, the operation knob is formed into one body as shown in FIGS. 12 and 13, thereby attaching of the operation knob to the lateral fin may become easier.

Figure 12:
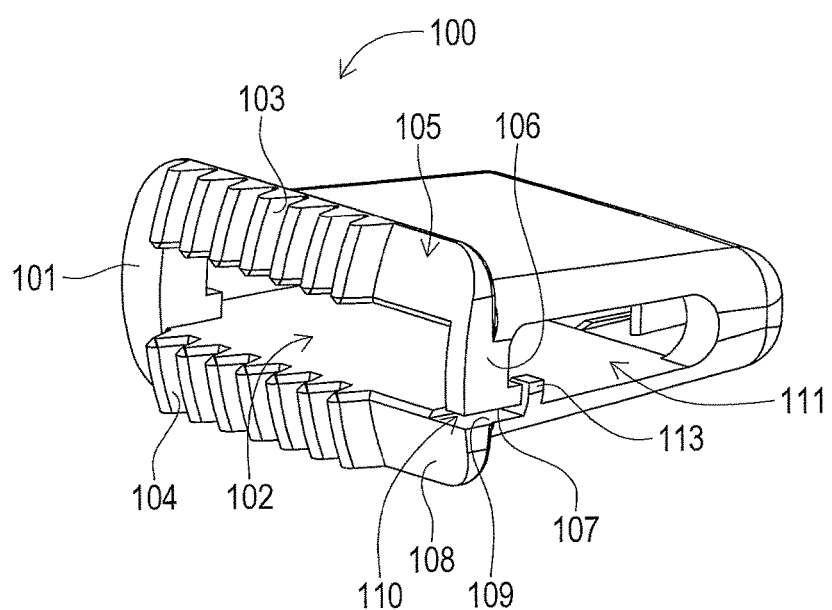

Concretely, as shown in FIG. 12, an opening 102 is formed at a rear end 101 (left side end portion in FIG. 12) of an operation knob 100 formed into one body. At an upper side and a lower side of the opening 102, an upper gear part 103 and a lower gear part 104 are divisionally formed, both gear parts 103 and 104 being meshed with a gear part (not shown) formed on a vertical fin (not shown).

At the rear end 101 of the operation knob 100, an enclosing wall 105 forming enclosure of the opening 102 is cut and separated at a right lower end portion. Concretely, a clearance 110 is formed between a lower end surface 107 of a lower extended portion 106 forming a right side portion of the opening 102 and an upper surface 109 of a lateral extended portion 108 to the right direction from the lower gear portion 104, the upper surface 109 facing to the lower end surface 107. Based on existence of this clearance 110, the upper part and the lower part of the operation knob 100 may become movable within a range of the clearance 110.

Figure 13:
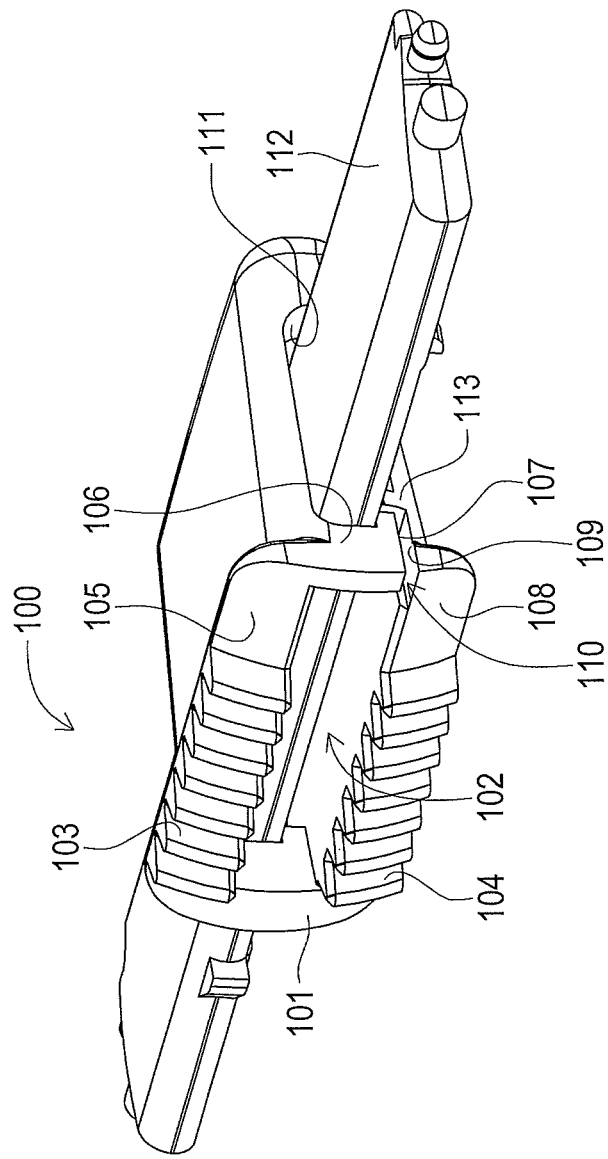

Accordingly, as shown in FIG. 13, when the lateral fin 112 is inserted in one (fin insertion opening at the right side in FIGS. 12 and 13) of fin insertion openings 111 formed at both sides of the operation knob 100, both of the upper part and the lower part of the operation knob 100 are resiliently deformed in a direction to enlarge the clearance 110 according to insertion of the lateral fin 112. Thereby, the lateral fin 112 can be attached to the operation knob 100.

However, since the operation knob 100 is formed from resin material, the upper part and lower part of the operation knob 100 may be easily deformed in a direction that the lower end surface 107 of the lower extended portion 106 and the upper surface 109 of the lateral extended portion 108 mutually approach, that is, in a direction that the clearance 110 becomes narrow.

As mentioned, when the lower extended portion 106 and the lateral extended portion 108 deforms in the direction that the clearance 110 becomes narrow, a sliding portion 113 contacting to and sliding on the lower surface of the lateral fin 112 unnecessarily and strongly interferes with the lateral fin 112. As a result, there is a problem that operation load of the operation knob 100 against the lateral fin 112 increases, thus sliding operability of the operation knob 100 is spoiled.

SUMMARY OF THE INVENTION

The present invention has been made to dissolve the above problem and has an object to provide an operation knob used in a register, the register including:

a retainer with an air blowout opening;

a plurality of vertical fins rotatably supported so as to simultaneously rotate in a right and a left direction within the retainer in a lengthwise direction of the register; and a lateral fin rotatably supported near the air blowout opening of the retainer so as to rotate in an up and a down direction relative to a height direction of the register, the operation knob being: (i) attached to the lateral fin so as to slide in a longitudinal direction of the lateral fin, and (ii) rotatably connected to one of the plurality of vertical fins to simultaneously rotate the plurality of vertical fins in the right and left direction based on a sliding movement along the lateral fin, the operation knob comprising:

a plurality of fin insertion holes formed at both side surfaces of the operation knob, the lateral fin being retained in a state where the lateral fin is inserted into the plurality of fin insertion holes;

a jig insertion hole formed at a side of the operation knob, one of the plurality of vertical fins being rotatably connected to the side of the operation knob; and a separation portion formed by separating a part of the jig insertion hole, the separation portion including:

a first side and a second side of the operation knob, the first side and the second side of the operation knob being configured to face each other; and a connection portion partially contacting one side of the first side and the second side of the operation knob with the other side of the first side and the second side of the operation knob, the connection portion including:
 a first separation surface protruding from the one side of the first side and the second side of the operation knob; and
 a second separation surface protruding from the other side of the first side and the second side of the operation knob, wherein
 a constant clearance is ensured between the first side and the second side of the operation knob in a state where the first separation surface and the second separation surface contact with each other.

Here, in the above operation knob, the connection portion may be formed by making a cutout portion in the separation portion.

According to the operation knob, the lateral fin is inserted in the fin insertion hole after the connection portion is separated by inserting the jig in the jig insertion hole, and after the lateral fin is inserted in the fin insertion hole, the first separation surface of the connection portion on one facing side and the second separation surface of the connection portion in the other facing side contact with each other. Therefore, when the operation knob is attached to the lateral fin, the operation knob can be easily attached to the lateral fin based on that the separation portion formed in the operation knob is resiliently deformed. Further, after the operation knob is attached to the lateral fin, the first separation surface and the second separation surface are contacted with each other, therefore the clearance in the separation portion can be always retained more than a predetermined value and sliding ability of the operation knob for the lateral fin can be retained with a predetermined degree.

Further, in case that the connection portion is formed by making the cutout portion in the separation portion, the cutout portion can be made when the operation knob is formed into one body, thus the connection portion can be easily formed.

BRIEF DISCLOSURE OF THE DRAWINGS

Figure 2:
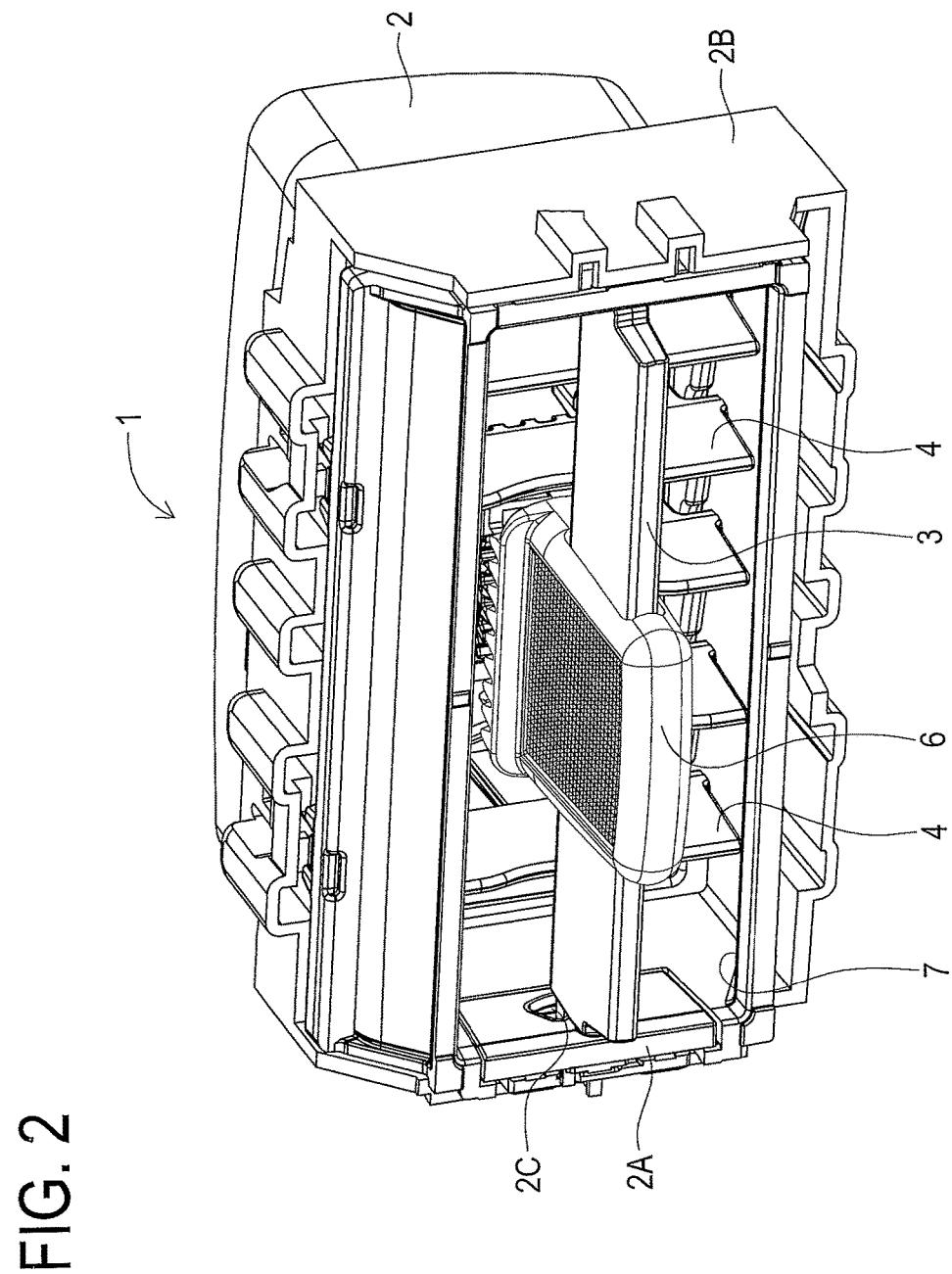
Figure 3:
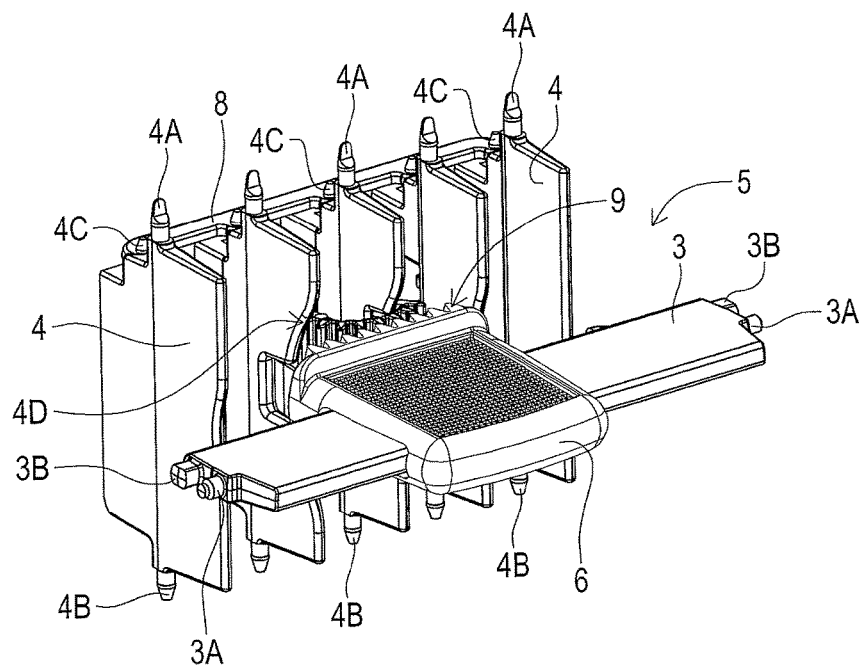
Figure 4:
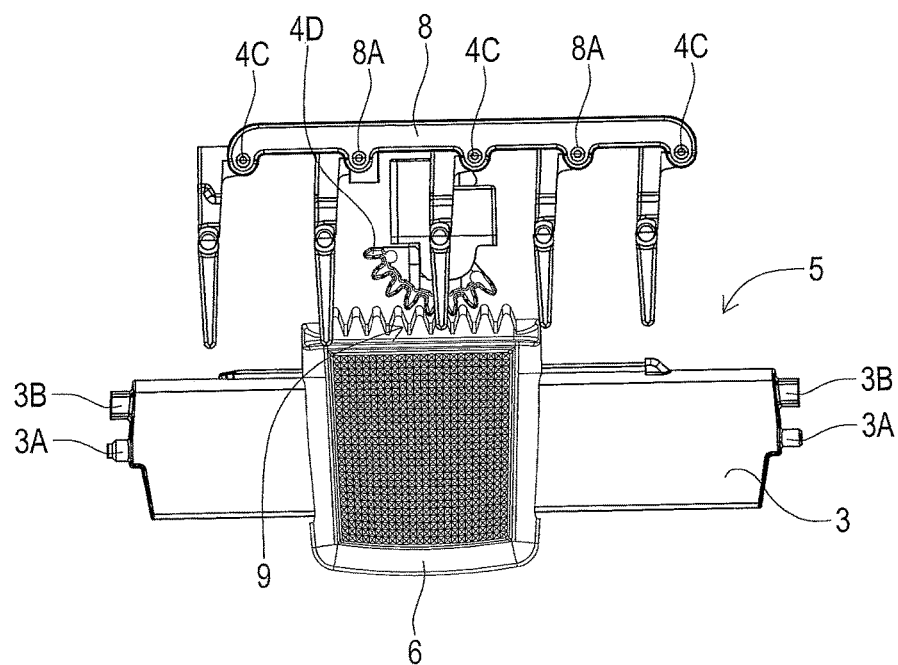
Figure 5:
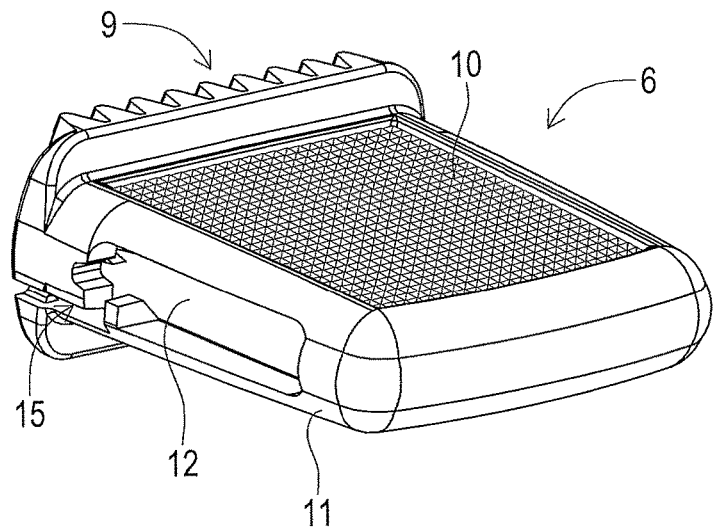
Figure 6:
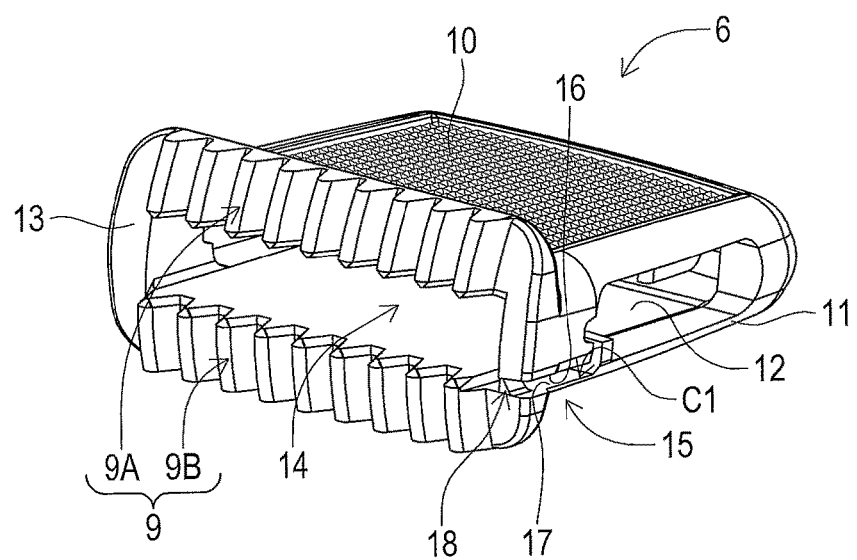
Figure 7:
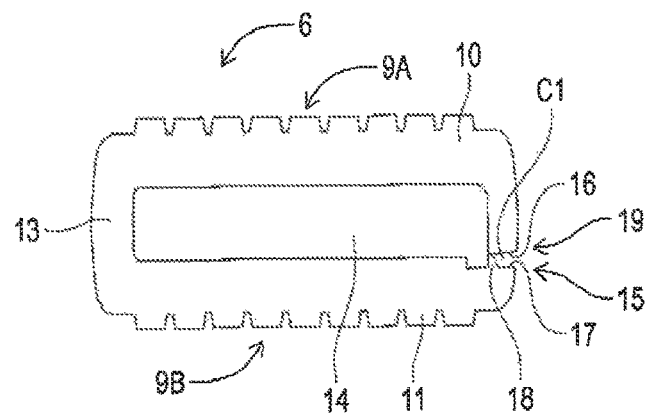
Figure 8:
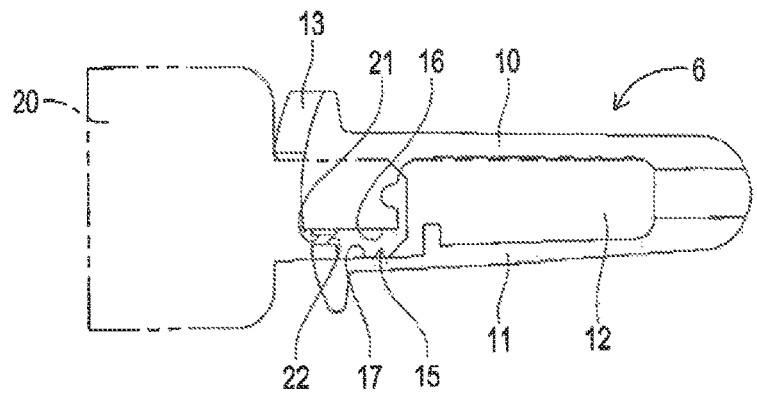
Figure 9:
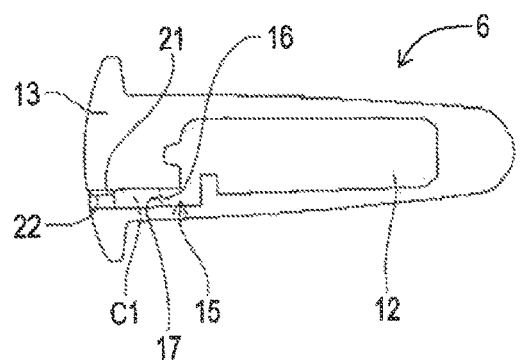
Figure 10:
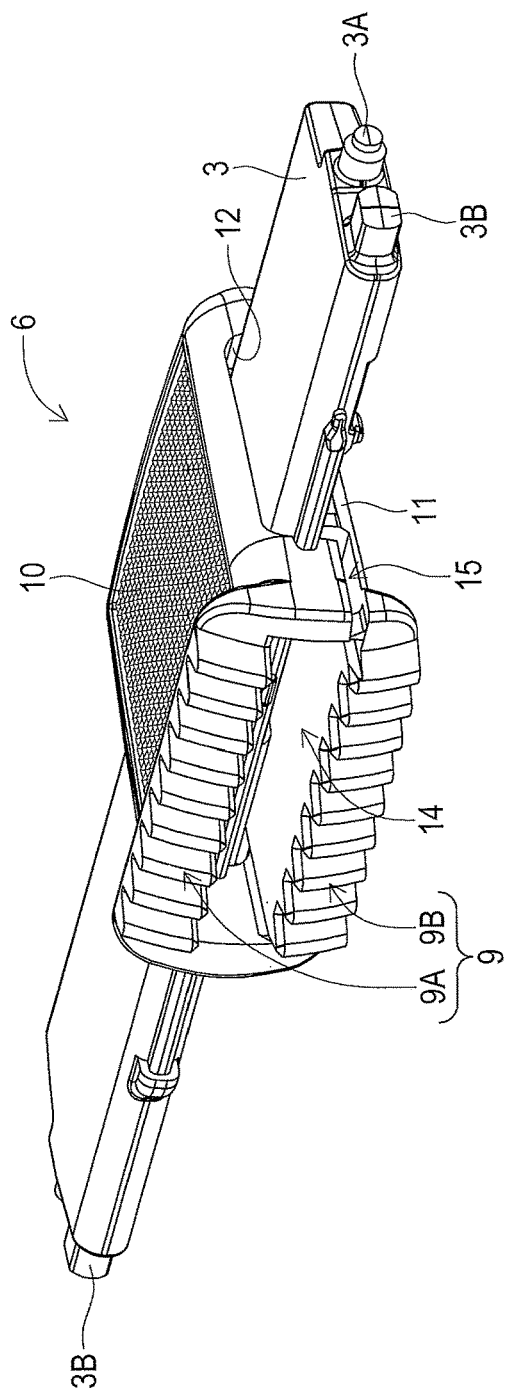
Figure 11:
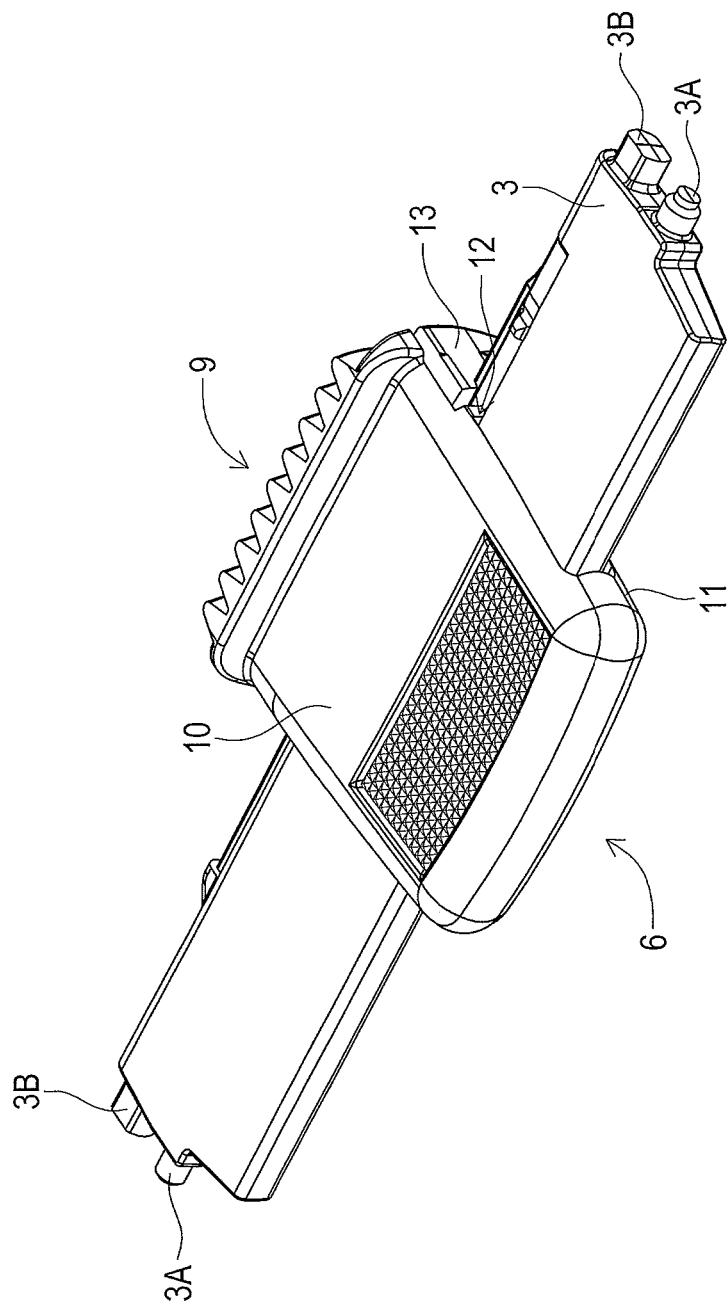

FIG. 1 is a front view of the register according to the embodiment.
FIG. 2 is a front perspective view of the register.
FIG. 3 is a front perspective view of a fin mechanism in the register.
FIG. 4 is a plan view of the fin mechanism in the register.
FIG. 5 a front perspective view of the operation knob.
FIG. 6 is a rear perspective view of the operation knob.
FIG. 7 is a schematic sectional view of a rear end of the operation knob.
FIG. 8 is a schematic sectional view showing a state where a jig is inserted in a jig insertion hole formed at the rear end portion of the operation knob.
FIG. 9 is a schematic sectional view showing a state that the jig is removed from the jig insertion hole formed at the rear end portion of the operation knob.
FIG. 10 is a rear perspective view showing a state that the operation knob is attached to the lateral fin.
FIG. 11 is a front perspective view showing a state that the operation knob is attached to the lateral fin.
FIG. 12 is a rear perspective view of an operation knob of the related art.
FIG. 13 is a rear perspective view showing a state that an operation knob of the related art is attached to a lateral fin.

DETAILED DESCRIPTION OF THE PREFERRED EMBODIMENTS

Hereafter, the operation knob used in a register according to the present invention will be described with reference to the drawings based on the embodiment realizing the present invention.

First, basic construction of the register according to the embodiment will be described with reference to FIGS. 1 to 4.

The register 1 according to the embodiment basically has a retainer 2 formed into a tubular with a rectangular section shape, a fin mechanism 5 (see FIGS. 3 and 4) constructed from one lateral fin 3 and a plurality of vertical fins 4 (five vertical fins as shown in FIGS. 1 to 4) and arranged within the retainer 2, and an operation knob 6 slidably attached to the lateral fin 3

Here, the retainer 2 introduces air-conditioned air guided through a duct from an air-conditioning device arranged in a vehicle (car), from a rear end opening (rear opening formed at the right side in FIG. 2) into an inner side. Air is blown out from an air blowout opening 7 formed at a front end portion of the retainer 2 (left side end portion in FIG. 2) into a room of the vehicle.

Near the air blowout opening 7, the lateral fin 3 is rotatably supported in an up and down direction through support shafts 3A (see FIGS. 3 and 4) between a left side wall 2A and a right side wall 2B of the retainer 2. By the lateral fin 3, a blowout direction of air blow out from the air blowout opening 7 can be changed within a predetermined range in the up and down direction.

On each of both side end surfaces of the lateral fin 3, a guide protrusion 3B is protruded near and parallel with the support shaft 3A. The guide protrusion 3B is slidably guided in an arc-shaped guide groove 2C (only the left guide groove 2C is shown in FIG. 2) formed on an inner side surface of a left side wall 2A and a right side wall 2B of the retainer 2. Thereby, the guide protrusion 3B is guided along the guide groove 2 according that the lateral fin 3 is rotated in the up and down direction.

An upper support shaft 4A is formed on an upper end of each vertical fin 4 so as to protrude upward, and a lower support shaft 4B is formed from an lower end of each vertical fin 4 so as to protrude downward coaxially with the upper support shaft 4A. The upper support shaft 4A and the lower support shaft 4B are rotatably supported in an upper support hole (not shown) formed on an upper wall of the retainer 2 and a lower support hole (not shown) formed on a lower wall of the retainer 2, respectively. Thereby, both the upper support shaft 4A and the lower support shaft 4B are rotatably supported in the right and left direction.

Further, in each of the vertical fin 4, a connection rotatable shaft 4C is formed so as to protrude upward at a lower position than the upper end of the vertical fin 4 behind the upper support shaft 4A. The connection rotatable shaft 4C formed in each vertical fin 4 is rotatably supported in an support hole 8A (see FIG. 4) of a long link member 8.

Based on the above construction, each of the vertical fins 4 can be simultaneously rotated in the right and left direction.

Furthermore, as shown in FIGS. 3 and 4, a gear portion 4D is formed into one body with the center vertical fin 4 among plural vertical fins 4. The gear portion 4D is meshed with a gear portion formed in two steps of top and bottom at a rear end of the operation knob 6 (mentioned later in detail). The gear portion 4D is rotated in the right and left direction through movement of the gear portion 4D caused by slide operation of the operation knob 6 along the lateral fin 3. As a result, remaining vertical fins 4 are simultaneously rotated in the right and left direction according to rotation of the center vertical fin 4.

Here, the fin mechanism 5 is constructed from the lateral fin 3 and the plural vertical fins 4.

Hereinafter, the operation knob 6 will be described in detail with reference to FIGS. 1 to 7.

As shown in FIGS. 1 to 4, the operation knob 6 is attached to the lateral fin 3 so as to be slidable along the length direction of the lateral fin 3. At the rear end of the operation knob 6, it is formed the gear portion 9 which meshes with the gear portion 4D formed to the center vertical fin 4, thereby the operation knob 6 is rotatably connected to the center vertical fin 4 through the gear portions 4D and 9. Therefore, when the operation knob 6 is slid to the length direction of the lateral fin 3, all of the vertical fins 4 can be simultaneously rotated in the right and left direction based on rotatable connection between the gear portion 4D and the gear portion 9.

As shown in FIGS. 5 and 6, the operation knob 6 is constructed by forming an upper knob portion 10 and a lower knob portion 11 into one body. At both side surfaces of the operation knob 6, a fin insertion hole 12 (only one fin insertion hole is indicated in FIGS. 5 and 6) to insert the lateral fin 3 is formed.

At a rear end portion 13 of the operation knob 6 which is rotatably connected to the gear portion 4D of the center vertical fin 4, it is formed a jig insertion hole 14 to insert a jig (mentioned later) when the operation knob 6 is attached to the lateral fin 3 between the upper knob portion 10 and the lower knob portion 11.

Here, the jig insertion hole 14 is an opening necessary for die removal when the operation knob 6 is formed into one body. The gear portion 9 formed to the rear end portion 13 of the operation knob 6 is constructed from an upper gear portion 9A and a lower gear portion 9B on both up and down sides of the jig insertion hole 14. Although the operation knob 6 is rotated in the up and down direction with the lateral fin 3, mesh relation between the gear portion 9 and the gear portion 4D formed to the center vertical fin 4 always retained even if the gear portion 9 is constructed from the upper gear portion 9A and the lower gear portion 9B in two steps.

A right under corner portion shown in FIGS. 6 and 7 of the jig insertion hole 14 is separated, thereby a separation portion 15 is formed at the right under corner of the jig insertion hole 14. In the separation portion 15, an upper facing side 16 and a lower facing side 17 facing with each other exist. Further, in the separation portion 15, it is formed a connection portion 18 to partially connect both the upper facing side 16 and the lower facing side 17 to retain a predetermined clearance C1 between the upper facing side 16 and the lower facing side 17. The connection portion 18 can be formed by providing a cutout portion 19 when the operation knob 6 is formed into one body and the separation portion 15 is formed, as shown in FIG. 7. As mentioned, the connection portion 18 can be easily formed by providing the cutout portion 19 when the operation knob 6 is formed into one body.

In order to attach the operation knob 6 to the lateral fin 3, at first, a jig 20 is inserted in the jig insertion hole 14 as shown in FIG. 8 when the lateral fin 3 is inserted in the fin insertion hole 12 of the operation knob 6. Thereby, the connection portion 18 is separated. As a result, the connection portion 18 is separated between a first separation surface 21 of the separation portion 18 remaining on the upper facing side 16 and a second separation surface 22 of the separation portion 18 remaining on the lower facing side 17. Thereafter, as shown in FIG. 9, the first separation surface 21 and the second separation surface 22 are contacted with each other based on resin resiliency. The connection portion 18 is separated between either: (i) the first separation surface 21 (on the upper facing side 16) and the second separation surface 22 (remaining on the lower facing side 17), or (ii) the second separation surface 22 (on the upper facing side 16) and the first separation surface 21 (remaining on the lower facing side 17). The upper facing side 16 is a first interior side and the lower facing side 17 is a second interior side, or alternatively, the upper facing side 16 is a second interior side and the lower facing side 17 is a first interior side.

As mentioned in the above, the lateral fin 3 is inserted in the fin insertion hole 12 of the operation knob 6 where the connection portion 18 is separated by the jig 20. At that time, the upper knob portion 10 and the lower knob portion 11 are resiliently deformed in the direction to enlarge the clearance C1 in the separation portion 15, based on resin resiliency. Thereby, the lateral fin 3 can be easily attached to the operation knob 6.

When the register 1 is used during a long time under a state that the operation knob 6 is attached to the lateral fin 3, the upper knob portion 10 and the lower knob portion 11 in the separation portion 15 tends to approach with each other and deform so that the clearance C1 becomes narrow, due to resin deterioration.

Even in this case, in the separation portion 15, since the first separation surface 21 of the connection portion 18 remaining on the upper facing side 16 and the second separation surface 22 of the connection portion 18 remaining on the lower facing side 17 are contacted with each other after the connection portion 18 is separated, the minimum clearance corresponding to the height of the connection portion 18 can be always retained, based on that the first separation surface 21 and the second separation surface 22 are contacted, even if the upper knob portion 10 and the lower knob portion 11 in the separation portion 15 deform so that the clearance C1 becomes narrow. Therefore, sliding ability of the operation knob 6 against the lateral fin 3 can be retained in a predetermined quality even if the register 1 is used for a long time.

The present invention is not limited to the above embodiment, thus various improvements and modifications may be done within a scope of the present invention.

What is claimed is:

1. An operation knob used in a register, the register including:
   a retainer with an air blowout opening;
   a plurality of vertical fins rotatably supported so as to simultaneously rotate in a right and a left direction within the retainer in a lengthwise direction of the register; and
   a lateral fin rotatably supported near the air blowout opening of the retainer so as to rotate in an up and a down direction relative to a height direction of the register, the operation knob being: (i) attached to the lateral fin so as to slide in a longitudinal direction of the lateral fin, and (ii) rotatably connected to one of the plurality of vertical fins to simultaneously rotate the plurality of vertical fins in the right and left direction based on a sliding movement along the lateral fin, the operation knob comprising:

a fin insertion hole formed at each lateral side surface of the operation knob, the lateral fin being retained in a state where the lateral fin is inserted into the fin insertion hole;

a jig insertion hole formed at a rear side of the operation knob, one of the plurality of vertical fins being rotatably connected to the rear side of the operation knob; and a separation portion formed by separating a part of the jig insertion hole, the separation portion including:

a first interior side and a second interior side of the operation knob, the first interior side and the second interior side of the operation knob being configured to face each other; and a connection portion partially contacting one of the first interior side and the second interior side of the operation knob, the one of the first interior side and the second interior side including a first separation surface, the connection portion including:

a second separation surface protruding from an alternate one of the first interior side and the second interior side of the operation knob, the first separation surface and the second separation surface being configured to be completely separated from each other, wherein a constant clearance is ensured between the first interior side and the second interior side of the operation knob in a state where the first separation surface and the second separation surface are in contact with each other.

* * * * *